April 16, 1935.  E. L. WALL  1,997,890
UNIVERSAL TRACER
Filed Dec. 12, 1933  4 Sheets-Sheet 1
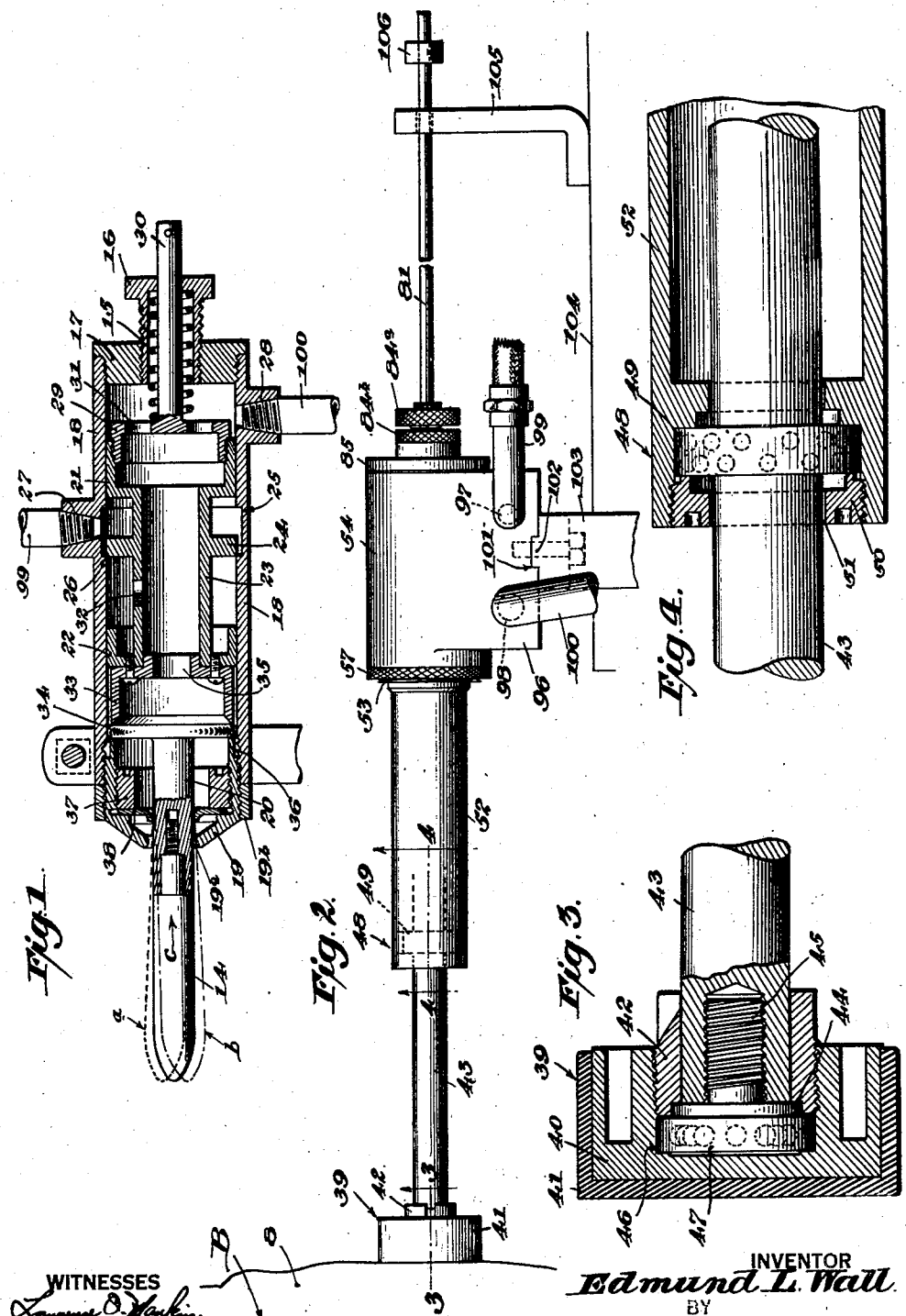
INVENTOR
Edmund L. Wall
BY
Munn, Anderson, Stanley, Foster & Reddy
ATTORNEYS

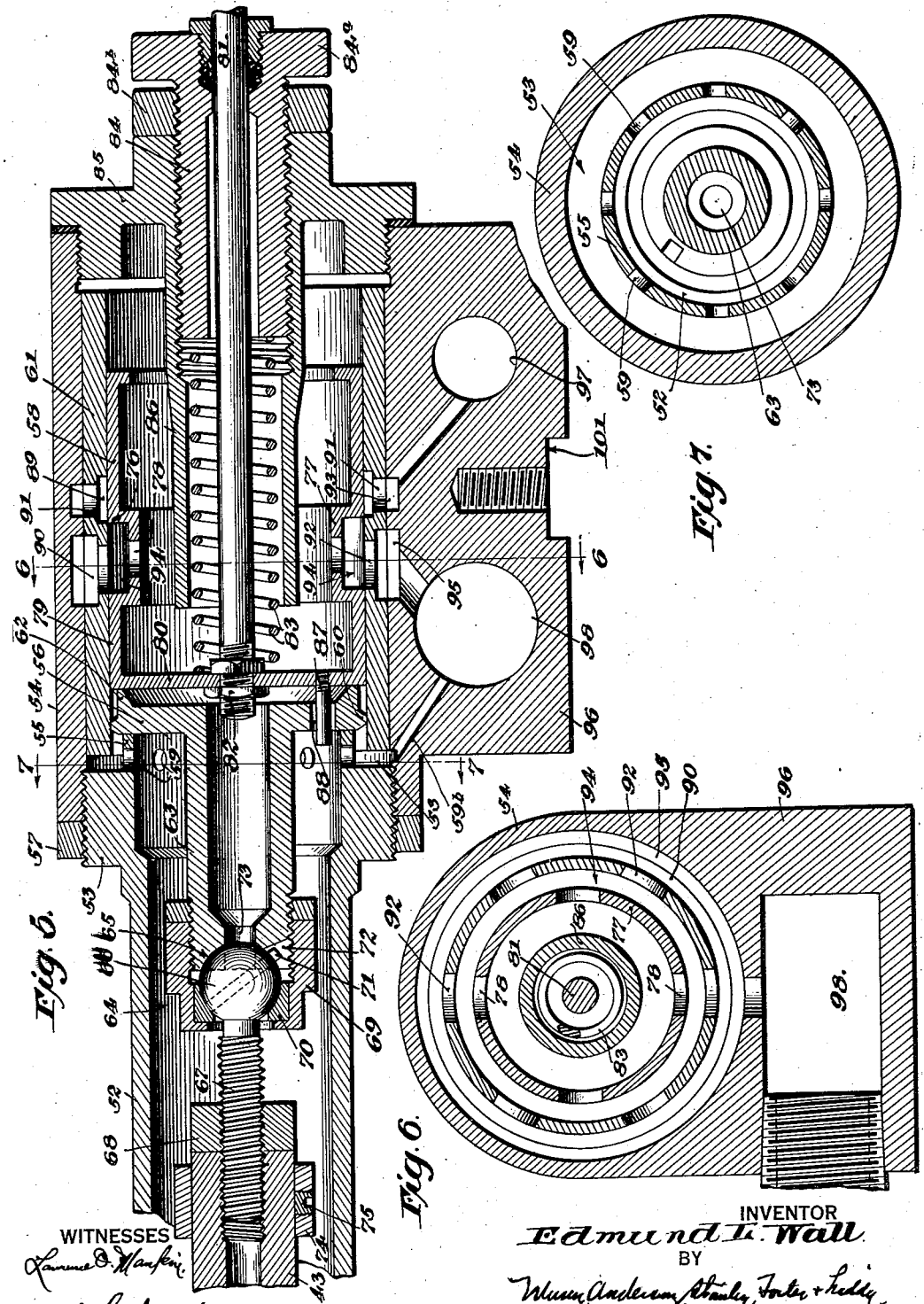

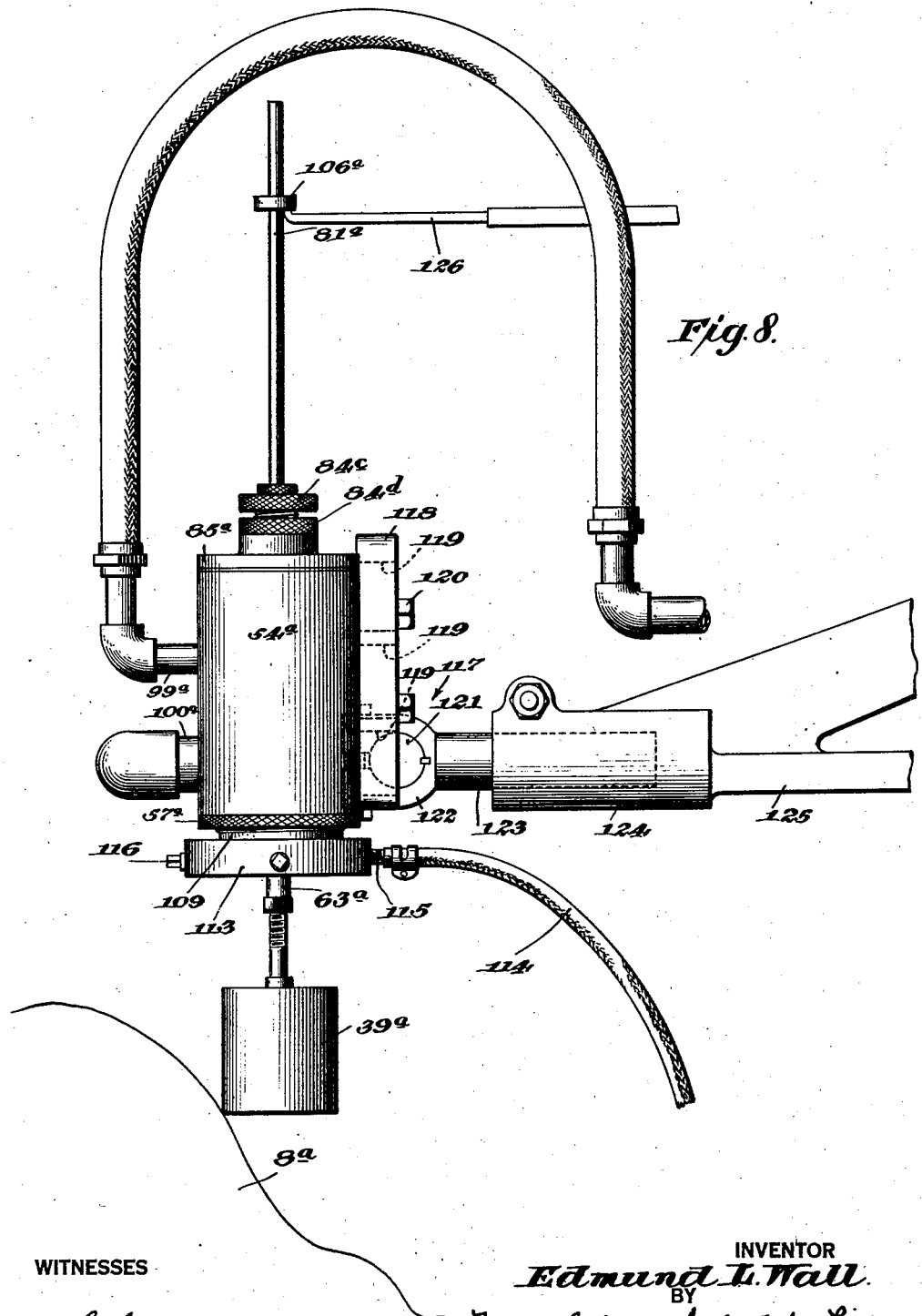

April 16, 1935.  E. L. WALL  1,997,890
UNIVERSAL TRACER
Filed Dec. 12, 1933   4 Sheets-Sheet 4
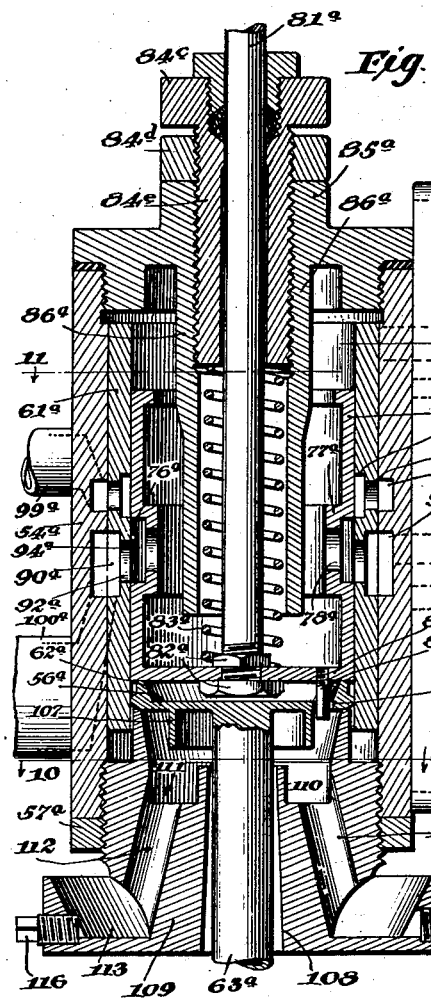
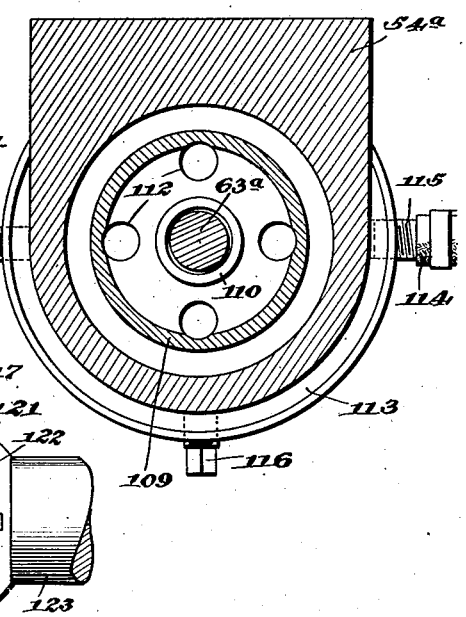
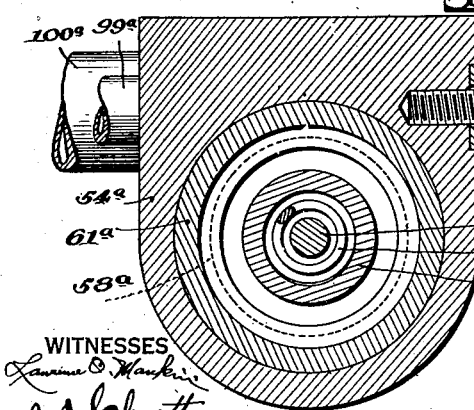
INVENTOR
Edmund L. Wall Patented Apr. 16, 1935

1,997,890

UNITED STATES PATENT OFFICE 1,997,890

UNIVERSAL TRACER

Edmund Leo Wall, Detroit, Mich., assignor, by mesne assignments, to R. W. Glasner, Chicago, Ill.

Application December 12, 1933, Serial No. 702,039

16 Claims. (Cl. 90—62)

This invention relates to improvements in duplicating machines, more especially in the tracers or feelers of such machines, and its objects are as follows:—

First, to provide a tracer for controlling a pressure fluid in accordance with the profile of a model, said fluid variably operating a cutter which, in turn, operates upon the work.

Second, to provide a tracer for controlling the fluid system of a hydraulically operated duplicating machine or for modelling attachments for standard boring and milling machines and the like.

Third, to provide a balanced extension tracer bar in the horizontal type of machine, which by virtue of being balanced eliminates the need for excessive spring pressure to hold the tracer tip against the model, and in turn insures a very light touch of said tip against the model and the consequent avoidance of damage thereto.

Fourth, to provide a balanced spool valve which, by virtue of the port arrangement, eliminates all chattering of said valve and consequently insures the elimination of interference with constant tracer tip pressure.

Fifth, to provide an anti-friction mounting for the tracer tip or button, said tip being covered with rubber or other yieldable material which serves to absorb the vibrations imparted to the tip and so prevents chipping or otherwise injuring the model.

Sixth, to provide a tracer for the vertical type of machine in which tracer the shank is balanced by virtue of seating on the anvil of the adjustable drain cup.

Seventh, to provide the valve disk with an annular drip flange for the purpose of preventing leakage of liquid onto the pattern.

Eighth, to provide for manually turning the tracer bar or tracer shank assemblage for the purpose of dislodging any foreign matter between the contacting walls of the spool valve and cylinder.

Ninth, to provide an automatic fluid release for the valve cylinder at a critical given point to prevent the cutter damaging the machine bed.

Other objects and advantages will appear in the following specification, reference being had to the accompanying drawings in which, Figure 1 is a longitudinal section of the tracer mechanism as disclosed in a co-pending application hereinafter referred to.

Figure 2 is a side elevation of a modification of the foregoing tracer mechanism.

Figure 3 is a detail section taken on the line 3—3 of Figure 2, particularly illustrating the anti-friction mounting for the rubber covered tracer tip.

Figure 4 is a detail section taken on the line 4—4 of Figure 2, particularly showing the mid-bearing on which the extension tracer bar is balanced.

Figure 5 is a central vertical longitudinal section of the central body part of the tracer mechanism in Figure 2.

Figure 6 is a cross section taken on the line 6—6 of Figure 5.

Figure 7 is a cross section taken on the line 7—7 of Figure 5.

Figure 8 is a side elevation of a modification of the tracer mechanism, illustrating its adaptation to a vertical type of boring and milling machine.

Figure 9 is a central vertical section of the body part of the tracer mechanism in Figure 8.

Figure 10 is a cross section taken on the line 10—10 of Figure 9.

Figure 11 is a cross section taken on the line 11—11 of Figure 9.

This application is in part a division of an application for patent for duplicating machine, filed by Edmund L. Wall, February 26, 1931, Serial No. 518,528 insofar as generic claims to the tracer mechanism are concerned. The principle of that mechanism prevails in the several modifications which have been developed to meet the demands respectively of a horizontal type of boring as well as vertical milling machines.

The tracer is especially adapted to follow the profiles of a relatively soft pattern, for example one made of plaster of Paris, and although working against such a pattern is designed to control relatively heavy fluid pressures and, in turn, relatively heavy cutting machinery. One of the outstanding advantages of this arrangement is the elimination of a hard pattern or model for the tracer. A plaster of Paris model can be made quickly and cheaply, and when it has served its purpose can be destroyed without the loss of any appreciable money value.

Attention is directed to the drawings. Figure 1 illustrates the tracer mechanism according to the heretofore referred to co-pending application. The tracer 14 is made to bear at its point on the surface of the pattern by a spring 15 which acts through the medium of a number of interposed elements and abuts the barrel 16 which is adjustable so that the spring tension can be varied. It is solely the spring tension that determines the pressure of the tracer tip against the pattern, and not the pressure fluid which traverses the tracer mechanism and is controlled in its flow by the tracer.

The barrel 16 is screwed into a head 17 which closes the right end of a valve casing 18. The left end of this casing is closed by a cap 19 which has an enlarged opening 19ª providing adjacent clearance for the necessary side motion of a protruding shank 20 by which the tracer 14 is removably carried. It is necessary to replace the tracer when different shapes and sizes are required.

A combined piston and balanced valve which is the chief element of a movable valve structure, occupies the casing 18 between its end closures. The piston components are denoted 21, 22. These are integral with a sleeve 23 which carries a circular valve plate 24. This valve plate occupies an annular chamber 25, and it is against one edge 26 that the valve plate seats in order to cut off the flow of pressure fluid. The edge 26 is, therefore, a valve seat. The cap 19 is additionally used for adjusting the valve plate 24 at the seat 26. The cap 19 is secured in position by a lock nut 19ᵇ.

An inlet 27 communicates with the chamber 25. Fluid is thus introduced into the casing 18 between the piston components 21, 22. Since the upright portions of the component 21 and plate 24 as well as that part of the sleeve 23 occurring therebetween constitute movable walls of the chamber 25 it follows that a movement of the so-called piston or spool valve may occur to the right without the necessity of the valve plate 24 having to act against fluid pressure.

In other words, when the valve plate 24 is seated the various walls consisting of parts of the component 21, sleeve 23, casing 18 and plate 24 will confine a volume of pressure fluid which is readily displaced by a movement of the tracer 14 to the right, the only resistance being the tension of the spring 15. Therefore, when the tracer encounters a raised place in its travel along the pattern, the tracer 14 will be displaced with the utmost ease. The pressure of the tracer 14 is regulated by the barrel 16, and may be made so light that even the softest pattern ordinarily employed can be traced without injury.

A fluid outlet 28 communicates with the casing 18 on the right side of the piston component 21. The base 29, of which a guide stem 30 is a part, is peripherally smaller than the bore of the casing 18 so that there may be no obstruction of fluid flowing through the holes 31 to the outlet 28. The base 29 is screwed into the component 21 as shown. The stem has a hole to receive a nail or the like, making a handle for manually turning the valve thus to work out any foreign matter between the contacting walls.

An opening 32 completes the passageway for the fluid. When the valve plate 24 is unseated there will be a flow of fluid from the inlet 27 into the casing 18, through the opening 32 into the sleeve 23 and out of both the holes 31 and outlet 28. A cup 33 has a rim with a sharp seating edge bearing against the disc 34 of the shank 20. A part of this cup has an opening 35 which provides a drain passage to accommodate oil seeping past the sleeve 23 at the component 22.

There is a separation between the cup 33 and disc 34 but the two parts are generally kept in contact by virtue of the engagement of the tracer 14 with the pattern and the pressure of the spring 15 in that direction. The tendency of the spring is to keep the disc 34 pressed against the flange 36 of the cap 19. A bushing 37 clamps a flexible washer 38 in place, the purpose of this being to prevent the leakage of fluid.

Attention is next directed to the first modification illustrated in Figures 2 to 7. This, like the mechanism in Figure 1, is adaptable to the horizontal type of boring and milling machine. The tracer tip, generally designated 39 has a roller base 40 (Fig. 3). This has a covering 41 of rubber or other yieldable material which prevents injury to the pattern due to the inevitable hammer action when the cutter (not shown) of the machine is making a heavy cut.

The base 40 is screwed onto a sleeve 42 (Fig. 3) and is held in place on a tracer bar 43 by means of the enlarged head 44 of a screw 45. The threaded bore of the roller base 40 has a smooth part 46 providing a cavity for a ball bearing cage 47. The tracer tip 39 is revoluble on the ball bearings. The sleeve 42 and head 44 constitute a swivel connection.

The tracer bar 43 is an extension. It agrees with the tracer 14 (Fig. 1). The purpose of the extension is to enable the tracer tip 39 to ride down into much deeper concavities in the pattern than would ever be possible with the relatively short tracer 14. The tracer bar has a mid-bearing generally designated 48 (Figs. 2 and 4). This comprises a cage 49 (Fig. 4) with a double row of balls. The bar 43 is slidable within the internal ball race (not shown). The tracer bar has limited rocking motion on the balls. In other words, it may oscillate on the balls, and for that purpose the retainer 50 (Fig. 4) has an enlarged opening 51. This agrees with the enlarged opening 19ª (Fig. 1).

A tube 52 (Figs. 2 and 4) has the mid-bearing 48 mounted on the inside near its outer extremity. This tube has a hub 53 screwed into the central body part 54 (Fig. 5). The hub has a flange 55 which abuts the disc 56, the two bearing the relationship of the disc 34 and flange 36 in Figure 1. Adjustments of the hub 53 are secured by a knurled lock nut 57. The purpose of adjusting the hub 53 is to additionally adjust the spool valve 58 with respect to its seat. The flange 55 has holes 59 which are adapted to receive an overflow of liquid. This flow occurs into the tube 52 which thus becomes a reservoir. The liquid will drain out through the holes 59 and a duct 59ᵇ into the exhaust line when the overflow has subsided.

The disc 56 (Fig. 5) has an annular rib 60 which rides on the internal wall of the liner 61 of the body 54. The liner 61 and body 54 are the equivalent of the cylinder 18 (Fig. 1). The disc 56 has an offset annular flange 62 (Fig. 5) which comprises an anvil for the spool valve 58. The flange 55 comprises an anvil for the disc 56. The disc may rock with respect to the anvil 55, and in doing so its anvil 62 will displace the valve 58.

A shank 63 (Fig. 5) on the disc 56, equivalent to the shank 20 of the disc 34 (Fig. 1) has the extension tracer bar 43 attached to it by means of a universal joint 64 (Fig. 5). This comprises a concavity 65 in the end of the shank 63 and a ball 66 on a spindle 67. The spindle is adjustably carried at 68 by the tracer bar 43. The ball 66 is secured by a coupling 69. This includes a filler 70 with a matching concavity.

A pin 71 projects from the ball. This fits in an opening 72 in the end of the shank 63. The opening is a slot, which is somewhat oversized as regards the pin 71 so that there will be a loose connection at this point between the ball and the shank 63. This is desirable to enable a free universal movement. The shank 63 is hollow, and it has a port 73 in communication with the concavity 65. Lubricant is supplied the universal joint 64 by this means.

A counterweight 74 is adjustably attached to the inner end of the tracer bar 43 as at 75 (Fig. 5). This weight counterbalances the tracer tip 39 (Fig. 2). In practice various sizes of tracer tips must be employed. As changes in tracer tips are made so must changes be made in the position of the counterweight 74 (Fig. 5) so that the tracer bar will remain balanced on its mid-bearing 48 which constitutes the fulcrum.

By virtue of the fact that the tracer bar 43 is balanced as brought out there is no need for excessive spring pressure to hold the tracer tip against the model. Were spring pressure relied upon for this purpose it is easy to see that heavy tension would be required to hold the tracer bar 43 on a level in case a tracer tip 39 so heavy were applied that the free end of the tracer bar would be compelled to sag. The balancing of the tracer bar insures a very light touch of the tracer tip 39 against the pattern, and as a consequence the soft material of the pattern is guarded from damage. In the construction of the spool valve 58 (Fig. 5) the shoulder 76 will be hereinafter known as the valve plate inasmuch as it is equivalent to the valve plate 24 (Fig. 1), and as in Figure 1 controls the passage of fluid at the valve seat.

The sleeve 77 has one or more openings 78 as before. The cup 79 is closed instead of open as at 33 (Fig. 1). The end closure 80 provides a base equivalent to the base 29 (Fig. 1). It is to this that a rod 81 (Figs. 2 and 5) is secured at 82 (Fig. 5).

The rod is surrounded at its inner end by a spring 83. This is equivalent to the spring 15 (Fig. 1). One end of the spring bears against the base 80 while the other end bears against the barrel 84, equivalent to 16 (Fig. 1). The barrel is adjustable in a head 85 which provides an end closure for the cylinder. A knurled head 84ª enables making the adjustments. A knurled nut 84ᵇ locks the adjustments. The head has an inwardly projecting tube 86 which contains most of the spring 83. The tube guards the spring against dropping down and possibly conflicting with the free back and forth motion of the spool valve.

A pin 87 projects outwardly from the base 80 and occupies an opening 88 in the disc 56. This opening is considerably oversized as regards the pin 87. The pin and opening make a loose connection between the disc 56 and the spool valve 58, and they tie the valve structure together, so to speak.

The pin 71 and opening 72 also constitute a loose connection between the tracer bar 43 and shank 63. The specific purpose of the pins 71, 87 is this:—Sometimes foreign matter will get between the contacting walls of the valve 58 and the liner 61. The exposed end of the tracer bar 43 (Fig. 2) is then taken hold of, and by manually turning the tracer bar the foreign matter is eventually dislodged. The pins 71 and 78 transmit the turning motion, and the loose connection of the pin 71 with the opening 72 does not impede the normal oscillating or reciprocating movements of the tracer bar by force of the contour of the pattern.

Annular inlet and outlet grooves 89, 90 (Fig. 5) have radial holes 91, 92 respectively communicating with an annular inlet passage 93 and with the chamber 94 defined by the mid-shape of the valve 58 and the liner 61. The groove 90 communicates with an annular exhaust passage 95. The passages 93, 95 are formed in the body 54.

The latter has a heavy bottom 96 and has a fluid inlet and outlet 97, 98 (Fig. 5). Pipes 99, 100 are part of a pressure fluid line and are commonly designated in Figures 1 and 2. They constitute part of the pressure fluid line disclosed in the co-pending application.

A groove 101 (Fig. 5) on the nether side of the bottom 96 receives the rib 102 (Fig. 2) of a yoke 103. This yoke, as disclosed in my co-pending application filed December 21, 1933, Serial No. 702,040 is mounted on and movable with a carriage (not shown). The carriage is movable in guides on a standard 104 (Fig. 2). The standard is fixed as regards the tracer mechanism. The tracer mechanism is movable relatively to the standard.

The latter has a bracket 105 (Fig. 2) with an opening to receive the rod 81. The rod has a stop 106 normally spaced a determined distance from the bracket 105. The stop constitutes means for effecting an automatic fluid release for the valve cylinder (Fig. 5) at a critical given position of the tracer tip 39 (Fig. 2) to prevent the cutter (not shown) damaging the machine bed.

This function is explained thus:—In Figure 2 the pattern or model is designated 8. This is secured to the machine bed B. The work (not shown) is also secured to the bed at a lower point and is adapted to be operated upon by the cutter. The cutter follows the tracer tip 39. Should the tracer tip eventually ride off of the pattern it would continue to advance toward the bed B by virtue of the pressure fluid-operated instrumentalities which keep the tracer and cutter mechanisms up to the pattern and work as brought out in co-pending application Serial No. 518,528.

But by the time the tracer tip 39 reaches such a position which the correspondingly positioned cutter will start to cut into the machine bed B the stop 106 (Fig. 2) will have reached the bracket 105. This stops the rod 81 so that it cannot advance to the left with the supposedly advancing tracer tip 39 and the body 54. The effect is to pull the spool valve 58 to the right (Fig. 5), and causes the valve plate 76 to uncover the inlet groove 89 with increasing wideness. The result is an increasing by-passing of pressure fluid from the inlet 97 to the outlet 98, relaxing its effect on the foregoing instrumentalities and stopping the cutter before it can damage the machine bed.

Attention is next directed to Figures 8 to 11 which illustrate a vertical type of tracer mechanism adaptable to a vertical milling machine. The structure of the latter is omitted here, but details of which as far as they concern the invention are illustrated in my co-pending application, filed December 12, 1933, Serial No. 702,041. In order to facilitate the description, such parts identical with Figure 5 are denoted by similar reference characters to which the exponent letters *a* have been added, the only exceptions being the knurled head 84ᶜ and lock nut 84ᵈ.

Other structure is as follows: The disc 56ª has an annular drip flange 107 which surrounds the shank 63ª but is spaced far enough from it to prevent any leaking liquid from finding its way to the bore 108 in the adjustable drain cup 109. The liquid is thus prevented from creeping along the shank 63ª (Fig. 9) and ultimately reaching the pattern 8ª (Fig. 8). A collar 110 (Fig. 9) also aids in preventing the liquid from reaching the shank, this collar defining part of a well 111 into which the liquid drips.

Ducts 112 conduct the liquid to a trough 113 to which an offtake pipe 114 is connected by means of a nipple 115. This nipple is adapted to be screwed into one of a plurality of threaded holes leading into the trough 113. All of these excepting the one occupied by the nipple are normally closed by plugs 116. In adjusting the cup 109 the nipple 115 is temporarily unscrewed to enable turning the cup. The nipple is then screwed into a new hole and the unwanted hole is plugged. The foregoing adjustments of the cup are made for the purpose of adjusting the valve plate 76a with respect to its seat as in the instance of Figures 1 and 5.

A mounting 117 enables universal adjustments of the body 54a so that the tracer tip 39a may be positioned wherever desired. This tip has a slight additional adjustment with respect to the shank 63a. The staff which carries it (Fig. 8) would be equivalent to the tracer 14. This is threaded and screwed into the shank 63a where it is locked by a nut. This mounting comprises a plate 118 which has a plurality of slots 119. Two of the slots receive bolts 120 which screw into the body 54a. The plate 118 carries a bar 121 which is mounted in a clamp head 122 of a second bar 123. This bar is mounted in the clamp head 124 of a bracket 125.

The rod 81a (Fig. 8) is actuated for the purpose of automatically unseating the valve plate 76a, but by reason of the fact that the tracer mechanism is upright instead of horizontal the bracket 105 (Fig. 2) is substituted by a linkage only partly designated at 126. This is to be regarded as the equivalent of the bracket, and its action will be to detain the stop 126a at a determined time, and by causing an automatic fluid release will prevent the cutter (not shown) from damaging the machine bed.

The operation is readily understood, but before going into the operation certain generically used terms should be kept in mind. In Figure 1 the tracer 14 is pointed but by virtue of the fact that this point is blunt it has its equivalent in the tips 39 (Fig. 2) and 39a (Fig. 8). The valve plate, whether in the form of a plate as at 24 (Fig. 1) or of a shoulder 76, 76a (Figs. 5 and 9), controls the communication of the inlet and outlet 27, 28 (Fig. 1) 89, 90 (Fig. 5) and 89a, 90a, (Fig. 9). In each of the respective forms of the invention the disc 34 (Fig. 1), 56 (Fig. 5) and 56a (Fig. 9) confronts the valve structure and is the means which causes fluctuations of the valve plate.

The spool valve and its immediately associated parts constitute the movable valve structure referred to before. It has been brought out that the tracer whether of the type in Figure 1, or fitted with an extension bar 43 (Fig. 2) or of the slightly adjustable type (Fig. 8), is subject to oscillations and reciprocations all due to the profile of the pattern.

The tracer and cutter (not shown) are harnessed together, so to speak, so that when the tracer goes into a cavity in the pattern 8 the cutter will be caused to produce a corresponding cavity in the work. Conversely, when the tracer rides upon an eminence on the pattern the cutter will be caused to produce a corresponding eminence on the work. In envisioning this sympathetic operation the reader must bear in mind that the tracer-cutter couple work between conflicting forces as brought out in application Serial No. 518,528. The action of the weight tends to move the couple away from the pattern and work. The force of a pressure fluid tends to move the couple toward the pattern and work.

It stands to reason that when the pressure fluid stream is diverted the weight will predominate and so move the couple away from the pattern and work. On the other hand, when the pressure fluid stream is permitted to work with full force the weight is overpowered and the couple is urged toward the pattern and work. Imagine the tracer in any of the forms as approaching and riding upon an eminence on the pattern. This eminence might be only a slight rise or it might be a comparatively tall spot in the pattern. The action on the tracer will be either an oscillation as suggested by the dot and dash line positions a, b (Fig. 1) or a bodily inward displacement in the direction of arrow c.

The result will be a displacement of the movable valve structure. The valve plate 24 (Fig. 1) or its equivalents, will be spaced from its seat 26. Communication will be established between the inlet and outlet 27, 28. Pressure fluid will be by-passed from one to the other through the valve structure as is plain in all of the forms of the invention. The force of the pressure fluid stream will be diminished insofar as its action in driving the tracer-cutter couple toward the pattern and work is concerned permitting the weight to pull the couple away. The result is a reproduction of the eminence in the work.

As long as the valve plate 24 remains closed on its seat the pressure fluid stream operates with full force to drive the couple leftward toward the pattern and work. As long as this is permitted the cutter will cut into the work. This is what happens when the tracer encounters a cavity. When the tracer reaches the bottom in the cavity the valve plate becomes unseated and the leftward movement checked as fully brought out above.

A time will come when the tracer reaches the end of the pattern. Instead of letting the tracer move off it and the cutter are checked in their inevitable motion toward the machine bed B by the automatic fluid release brought out in Figs. 2 and 8. The stop 106, 106a is simply detained by the bracket 105 or its equivalent 106. This pulls the movable valve structure to the right while the rest of the apparatus still tends to move toward the bed. The result is an unseating of the valve plate and a release of the pressure fluid so that the apparatus is stopped in its motion toward the bed. This prevents the cutter from doing any damage.

I claim:—

1. In a duplicating machine, a tracer valve casing, a fluid pressure line having an inlet and an outlet at separated points in the casing, a valve plate in the cylinder controlling the communication of said inlet and outlet, a pattern tracer one end of which is adapted to follow the intricacies of a pattern, and means at the other end of the tracer to cause fluctuations of the valve plate in agreement with the vibration of the tracer and so variably control the pipe line flow through the casing.

2. In a duplicating machine, a tracer valve casing having an inlet and an outlet, a pressure fluid pipe line connected with the inlet and outlet, a movable valve structure in the casing to control the passage of fluid from said inlet to the outlet, said structure including confronting members of equal areas defining part of a fluid chamber in which the fluid exists under pressure, and a pattern tracer to variably actuate the valve structure and let variable quantities of the fluid through to the outlet, acting through the valve structure to hold the tracer against the work with a constant pressure regardless of the fluid pressure in said chamber.

3. In a duplicating machine, a tracer valve casing having an inlet and an outlet, a pressure fluid pipe line connected with the inlet and outlet, a movable valve structure in the casing to control the passage of fluid from said inlet to the outlet, said structure including confronting members of equal areas defining part of a fluid chamber in which the fluid exists under pressure, a pattern tracer to variably actuate the valve structure and let variable quantities of the fluid through to the outlet, acting through the valve structure to hold the tracer against the work with a constant pressure regardless of the fluid pressure in said chamber, and means for adjusting the degree of said constant pressure regardless of the fluid pressure in said chamber.

4. In a duplicating machine, a tracer valve casing having inlet and outlet connections for a pressure fluid pipe line, a valve structure movable in the casing for controlling the passage through of the fluid, said valve structure including a cupped end, a pattern tracer capable of both oscillation and reciprocation in respect to the casing, and a disc on the tracer contacting the rim of the cup so as to reciprocate the valve structure as the result of either oscillations or reciprocations of the tracer.

5. A tracer valve casing having a pressure fluid inlet and outlet, a movable valve structure in the casing to control communication between the inlet and outlet, resilient means applying pressure to the valve structure to tend to close the inlet, a tracer shank having a disc abutting said structure to receive the thrust of said resilient means, a tracer bar in extension from the shank, a universal joint between the inner end of the bar and shank, a tracer tip on the outer end of the bar, and means to balance the bar so that it will not sag under the weight of said tip and so require excessive pressure of said resilient means to keep the bar level, said means comprising a mid-bearing constituting a fulcrum for the bar, and an adjustable weight and adjustably carried means on the bar adjacent to the joint.

6. A tracer valve casing having pressure fluid openings, a valve structure having its wall in contact with the casing wall, a tracer and means to normally move said structure in one direction, opposing pressure means tending to move said structure in the opposite direction, and means to freely turn the valve structure while in any position within limits in the casing to work out any foreign matter between the contacting walls.

7. A tracer valve casing having pressure fluid openings, a valve structure to control the openings having its wall in contact with the casing wall, a tracer shank and means by which to normally impart endwise movement to the valve structure, and a connection between said structure and said means said connection operating to permit a turning movement of the shank with respect to said valve structure, for working out foreign matter between said contacting walls.

8. A tracer valve casing having pressure fluid openings, a valve structure to control said openings and having its wall in contact with the casing wall, means to impart normal end motion to said structure said means comprising a shank and disc the latter contacting one end of the structure, a tracer bar in extension from the shank, a universal joint between the bar and shank, and connections in the joint between the bar and shank and between said structure and disc to enable turning the structure by manual turning of the bar for working out foreign matter between the contacting walls.

9. A tracer valve casing having pressure fluid openings, a valve structure in the casing to control said openings, a tube extending from the casing, means to move the valve structure endwise, said means including an extension tracer bar partly occupying the tube and extending therefrom, and a ball bearing mounted at the approximate end of the tube slidably receiving the bar and providing a fulcrum for its rocking motion.

10. In a tracer mechanism, a tracer bar, a tracer tip at the end of the bar for contacting and moving over a pattern, and a ball bearing interposed between the tip and bar and by means of which bearing said tip is turnably mounted on the bar.

11. In a tracer mechanism, a tracer bar, a tracer tip at one end of the bar for contacting and moving over a pattern, a ball bearing interposed between the tip and bar and by means of which bearing said tip is turnably mounted on the bar, and a yieldable covering for the tip.

12. A tracer valve casing having pressure fluid openings, a movable valve structure in the casing to control communication between said openings, a disc having an anvil to support the valve structure, a tracer shank pendent from the disc, a tracer tip carried by said shank for engagement with a pattern beneath the shank, and means to divert fluid escaping past the anvil from the shank to prevent its reaching the pattern.

13. A tracer valve casing having pressure fluid openings, a movable valve structure in the casing to control communication between said openings, a disc having an anvil to support the valve structure, a tracer shank pendent from the disc, a tracer tip carried by said shank for engagement with a pattern beneath the shank, means to divert fluid escaping past the anvil from the shank to prevent its reaching the pattern, and means comprising an annular drip flange on the nether side of the disc.

14. A tracer valve casing having pressure fluid openings, said casing being movable toward a pattern, a movable valve structure in the casing to control communication between said openings, a tracer to contact the pattern and to variably move the valve structure in accordance with the profile of the pattern, and means to effect an automatic pressure release when the tracer nears a critical low point in the pattern, said means comprising a rod and stop carried by the valve structure and a relatively fixed bracket which is movable by the stop to move the valve structure to an open position with respect to said openings.

15. A tracer valve casing having fluid pressure openings, a valve structure to control the openings having its wall in contact with the casing wall, a tracer shank and means by which it normally imparts endwise movement to the valve structure, and a pin and slot connection between said structure and said means to permit a turning movement of the shank with respect to the said valve structure, for working out foreign matter between said contacting walls.

16. A structure of the character described embodying a tracer valve casing having a pressure fluid inlet and outlet, a movable valve to control communication between the inlet and outlet, resilient means applying pressure to the valve to tend to close the inlet, a tracer shank having a disc within the casing abutting said valve to receive the thrust of said resilient means, a tracer bar in extension from the shank, and means to balance the tracer bar so as to eliminate the need of excessive pressure by said resilient means to keep the tracer bar level, said casing housing the valve and guiding the movement of the valve and tracer.

EDMUND LEO WALL.